Oct. 31, 1939.  W. J. SMITH  2,178,005
WINDSHIELD CLEANING DEVICE
Filed July 22, 1937
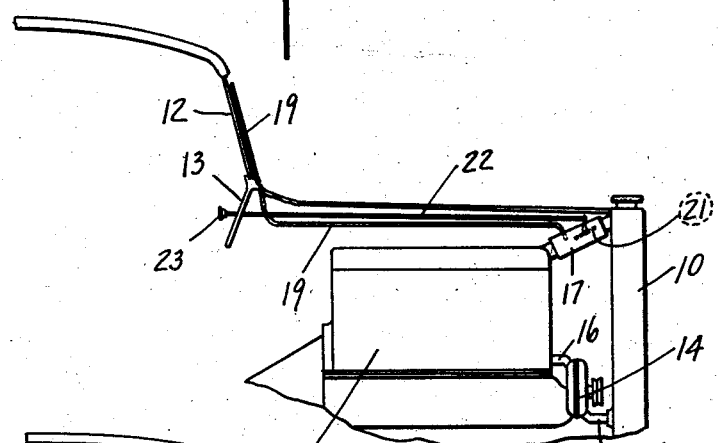
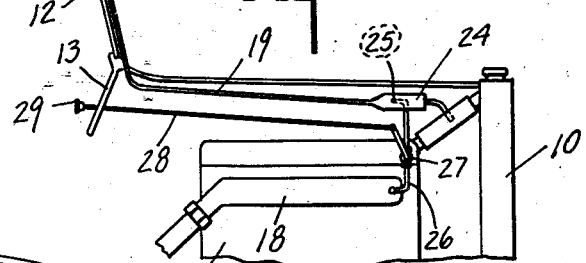
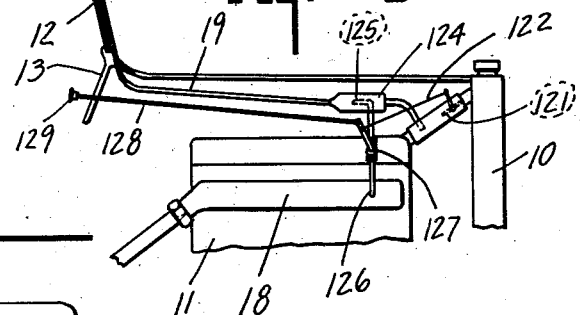
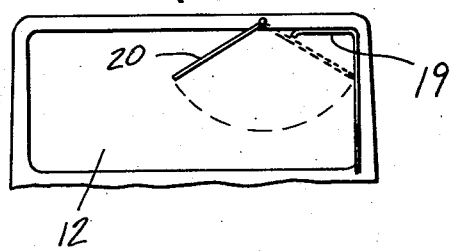
INVENTOR.
WILEY JACKSON SMITH.
BY
ATTORNEYS.

UNITED STATES PATENT OFFICE 2,178,005

WINDSHIELD CLEANING DEVICE

Wiley Jackson Smith, Bedford, Ind.

Application July 22, 1937, Serial No. 155,081

1 Claim. (Cl. 20—49.5)

This invention relates to a windshield cleaning device.

Practically all motor vehicles are today equipped with windshield wipers which satisfactorily clean a portion of the windshield during a rainstorm when there is an adequate supply of water. However, when there is not sufficient rain to wash away dust and dirt or when the windshield has been sprinkled with muddy water by a passing car or by passing through a mud puddle, the operation of the wiper usually results in muddy streaks on the windshield, which seriously hamper the vision of the driver.

One object of the present invention is to provide a convenient means for supplying water to the windshield in sufficient quantities to clean the same thoroughly under the last-mentioned conditions. To this end, water is drawn from the engine cooling system and discharged onto the windshield. A very small amount is required for each cleaning so there is no appreciable diminution of the cooling water supply.

Another object of the invention is to clean from the windshield accumulations of ice which may form thereon during a sleet storm or freezing rain. This is accomplished by periodical applications of the hot water from the engine cooling system by the same apparatus used for removing dust and mud streaks.

Other objects and features of the invention will be readily understood from the accompanying drawing and the following description and claim:

Fig. 1 is a diagrammatic view of a portion of an automobile having one form of the invention applied thereto. Fig. 2 is a similar view with an alternative form of the invention. Fig. 3 is a similar view with a third form of the invention. Fig. 4 is a front view of the windshield of an automobile to which the invention has been applied in either of the three forms.

In the drawing there is shown an automobile having the usual radiator 10, engine 11, windshield 12, instrument board 13, water pump 14 with connections 15 and 16 for drawing water from the radiator to the cooling chambers of the engine and return line 17 for returning the water to the radiator. In Figs. 2 and 3, the exhaust manifold 18 of the engine is also shown.

In each of the figures, there is shown a pipe 19 connected to the return line 17 and terminating as shown in Fig. 4 adjacent the portion of the windshield 12 normally swept by a windshield wiper 20.

In Fig. 1 there is provided a butterfly valve 21 operated by a rod 22 terminating in a button 23 on the instrument board of the automobile. When in its normal position the butterfly valve 21 is parallel to the direction of the line 17 and does not impede the flow of water therethrough. When it is desired to supply water to the windshield, the knob 23 is pulled, partially closing the butterfly valve 21 and deflecting a jet of water through the pipe 19 to the surface of the windshield. The operation of the windshield wiper may then effectively clean off any dust or accumulated muddy streaks on the windshield. The water need be supplied for only a few seconds and then the button 23 may be pressed to return the butterfly valve to its normal position. If desired, a spring may be used for the return movement.

The form of the invention just described is adapted for use in an automobile having a water pump capable of supplying sufficient pressure to elevate the water to the height of the windshield. In Fig. 2 there is shown a form of the invention for use with an engine in which the water pump does not have sufficient pressure to adequately supply the windshield but in which the exhaust gases are discharged from the engine under sufficient pressure to operate a small ejector. In this form of the invention, an ejector 24 of the well-known jet type is placed in the pipe 19 and is provided with an internal jet 25 connected by a pipe 26 to the exhaust manifold. A valve 27 is installed in the pipe 26 and is operated by a rod 28 and button 29 in the same manner as the butterfly valve 21 is operated. By this means the valve 27 may be opened to supply exhaust gases under pressure from the exhaust manifold to the ejector 24. The partial vacuum created by the ejector draws water from the return line 17 and delivers the same to the windshield for cleaning.

The form of the invention shown in Fig. 3 is for use with engines in which the water pump is not capable of supplying sufficient pressure and in which the exhaust gases are not under sufficient pressure to alone supply the necessary pumping action. In this form of the invention an ejector 124 having a jet 125, a connection 126 with the exhaust manifold and a valve 127 operates in the same manner as the ejector 24 previously described. In addition, there is placed in the return line 17 a butterfly valve 121. Both valves may be operated simultaneously by means of a button 129 and rods 128 and 122. In this form of the invention, the butterfly valve 121 deflects the water from the return line 17 to the ejector. The ejector then provides sufficient additional force to raise the water to the level of the windshield.

Each of the described forms of the invention, when used with the type of engine for which it is designed, may be instantaneously operated by the driver to clear accumulations of dust or mud from the windshield. Each form also provides heated water for clearing away accumulations of ice. For the latter purpose, the forms using the hot exhaust gases are more efficient since the additional heat derived from the gases decreases the cooling which might take place in passing through pipe 19.

The foregoing specification describes three preferred forms of the invention but is not to be considered as limiting the invention to the precise structures shown. The details may be varied by those skilled in the art without departing from the scope of the invention as defined in the appended claim.

The invention claimed is:

In combination with a motor vehicle having an engine, a radiator, a pump and connections for passing a cooling fluid from said radiator to said engine, a return line for said fluid from said engine to said radiator, a windshield, and an exhaust manifold; a pipe connected to said return line and terminating adjacent the outer surface of said windshield, a valve in said return line between said pipe and said radiator adapted when partially closed to deflect cooling fluid from said return line to said pipe, an ejector in said pipe, a connection between said ejector and said exhaust manifold for delivering exhaust gases to operate said ejector for forcing cooling fluid through said pipe to said windshield, a valve in said connection, and means for operating both of said valves.

WILEY JACKSON SMITH.